United States Patent

[11] 3,616,917

| [72] | Inventor | John A. Hellwege<br>1088 Parkleigh Raod, Columbus, Ohio 43220 |
|---|---|---|
| [21] | Appl. No. | 824,990 |
| [22] | Filed | May 15, 1969 |
| [45] | Patented | Nov. 2, 1971 |

[54] LIQUID RECLAMATION SYSTEM
2 Claims, 1 Drawing Fig.

[52] U.S. Cl. .................................................. 210/167,
210/170, 210/262, 210/299, 210/537
[51] Int. Cl. ....................................................... B01d 35/02
[50] Field of Search ........................................... 210/123,
167, 170, 255, 262, 299, 522, 537

[56] References Cited
UNITED STATES PATENTS

| 1,658,362 | 2/1928 | Walker | 210/262 X |
| 1,876,243 | 9/1932 | Kelly | 210/123 |
| 3,261,779 | 7/1966 | Sullins et al. | 210/262 X |
| 3,455,457 | 7/1969 | Popelar | 210/262 X |

*Primary Examiner*—Frank A. Spear, Jr.
*Attorney*—William S. Rambo

ABSTRACT: A system for the reclamation of liquid used in various cleaning operations which comprises a plurality of settling and decanting tanks and a filter so arranged as to cause removal of contaminating solids by precipitation, or sedimentation and by filtration, and removal of relatively lighter weight solid and liquid contaminants of overflow decantation.

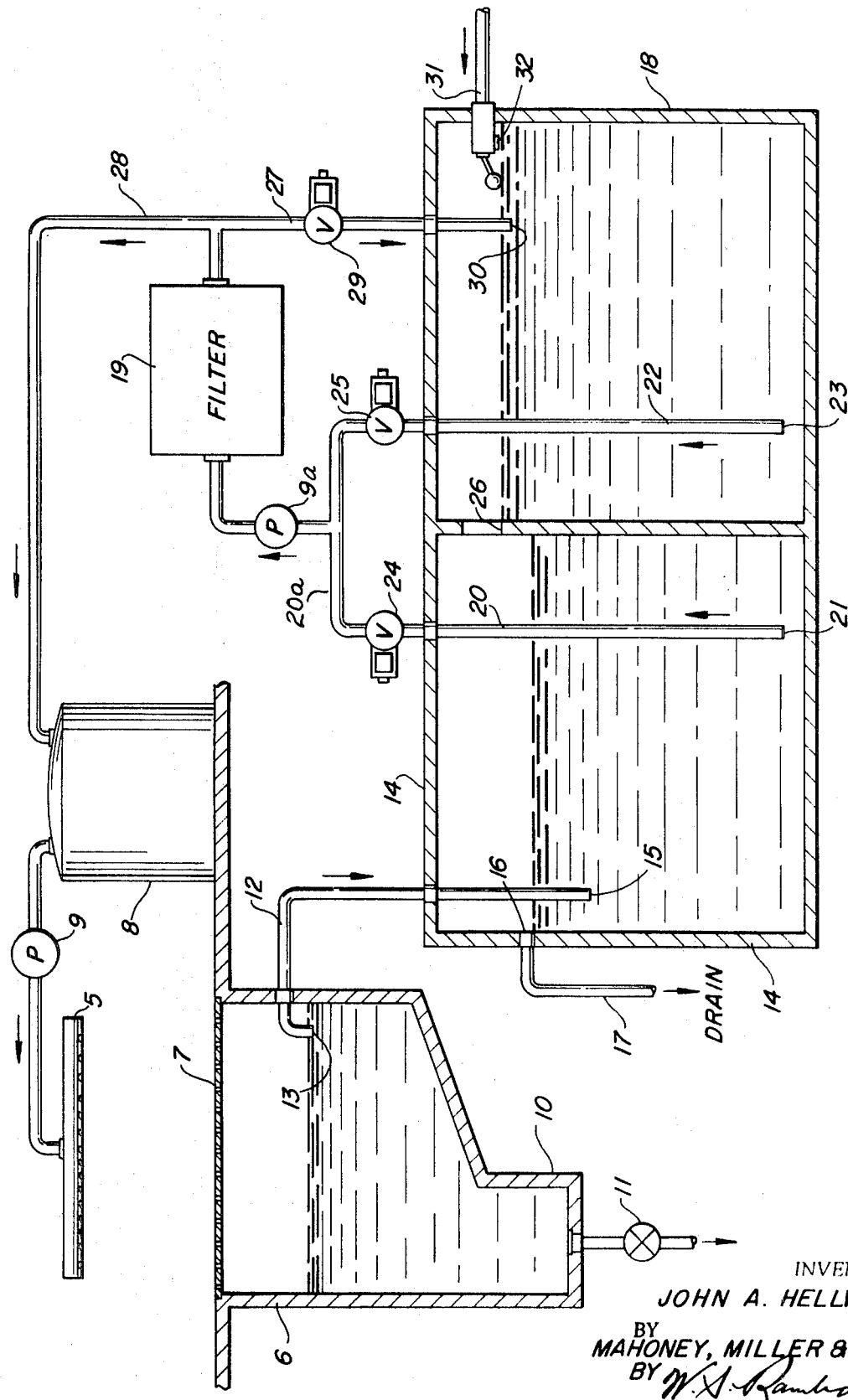

LIQUID RECLAMATION SYSTEM

BACKGROUND OF THE INVENTION

This invention relates generally to apparatus for reclaiming valuable liquids. In the past, various types of liquid reclamation systems have been proposed for the removal of undesirable solid contaminants by sedimentation and filtration. However, such prior systems have generally been deficient in failing to provide for the removal of lighter weight liquid contaminants, such as floating oil and greases from the valuable reclaimed liquid. Also, prior art systems of which I am aware have not provided a control arrangement whereby the liquid or solution being reclaimed may be substantially continuously recirculated through a filter and subjected to overflow decantation during periods when the reclaimed liquid is not being drawn off for use.

The present invention not only provides for reclaiming the waste water by removing the solid particles therefrom, but also provides an arrangement for removing the lighter contaminants which float on the surface of the water.

The attached drawing is a schematic illustration of a system which is suitable for the performance of this invention, but it is to be understood that specific variations in equipment may be made without departing from basic principles of the invention.

Although the following description refers specifically to wash water or solution reclamation, it is to be understood that the system of this invention is applicable to the reclamation of various types of cleaning liquids, such as detergent solutions, plain water, etc.

In the preferred example illustrated in the drawing, the system is shown in connection with a car washing station which may include suitable spray apparatus 5 for spraying wash water on a car. The water may subsequently be collected in a pit 6 through a suitable grille-type drain 7. The wash water may reach the spray 5 from a suitable supply tank 8, which may be heated, and may be withdrawn from the tank and supplied to the spray apparatus 5 by means of a pump 9. As indicated, this wash apparatus is merely an example of an application of the liquid reclamation system of this invention now to be described in detail.

The pit 6 is in the form of a tank of substantial depth to serve as a settling tank, in which the used wash water collects and it is provided with a lower sump 10 into which sludge and solid particles will settle from the used wash water or solution. This sump is provided with a valve-controlled outlet 11 by means of which the sludge may be withdrawn from time to time. Toward its upper end, the tank 6 is provided with an overflow pipe or conduit 12 which functions to carry off the wash water that collects in the settling tank, when it rises to a predetermined level within the tank as determined by the level of the inlet 13 of the pipe located within the tank 6. This pipe 12 leads to a first reservoir tank 14 and is provided with an outlet end 15 discharging thereinto at a preselected level.

The first receptacle or reservoir tank 14 is located at a lower level than the settling tank 6 and will receive wash water from the tank 6 by a decantation operation. As previously indicated, although a large amount of the solids will be removed in the settling process in the tank 6, the water may have lightweight contaminants on the surface of the water therein. This outlet 16 will determine the highest level of the water in the tank 14 and it is preferred what the outlet 15 of the pipe 12 be located below the drain outlet 16. This outlet may be connected to a drain pipe 17 leading to a selected location.

Disposed adjacent to the first receptacle or reservoir tank 14 is a second similar receptacle or reservoir tank 18. Means is provided for withdrawing the wash water from the tank 14 and directing it into the tank 18 through a filter unit 19. This means includes a conduit or drawoff pipe 20 which extends downwardly into the tank and has an inlet end 21 located slightly above the bottom of the tank. The reservoir tank 18 is provided with a similar drawoff pipe 22 which extends downwardly into the tank 18 and has an inlet end 23 adjacent the bottom of that tank. The pipe 20 is controlled by a normally open, solenoid-actuated valve 24 and the pipe 22 is controlled by a normally closed, solenoid-actuated valve 25. Both pipes 20 and 22 are connected by a branched manifold 20a to the inlet of a pump 9a whose outlet is connected to the filter unit 19. This unit 19 may comprise any standard or conventional type of filter capable of removing relatively small size solid particles from liquid passing therethrough.

The tank 18 is provided with an overflow weir or outlet 16 leading into the tank 14 for determining the highest level of water in the tank 18. The outlet of the filter 19 is connected to a return pipe branch 27 which leads to the upper portion of the tank 18 and to a branch 28 which leads to the water tank 8 or some other unit for using the reclaimed water. The branch 27 is controlled by a normally open solenoid-actuated valve 29 and is provided with a lower outlet end 30 located in the upper portion of the tank 18 at a level below the weir outlet 26. This tank 18 is also provided with a source of fresh, makeup water, which may include the inlet pipe 31 having a float-controlled inlet valve 32 located at a selected level in the tank 18, substantially the same level as the outlet weir 26.

In operation, the used and contaminated wash water, which normally contains a detergent in solution, is collected in the settling tank 6 and, as its level rises, is carried off by thepipe 12 into the tank 14. During the times when the car wash system is inoperative, the solenoid valves 24 and 29 are open and the solenoid valve 25 is closed. Thus, the pump 9a will function to draw water from the bottom of the tank 14 by means of the pipe 20, taking it from a low point 21 in the tank. The pump will discharge this water into the filter 19 and it will pass from the filter through the pipe 27 into the tank 18. As the tank 18 overflows at 26, some of the water will go back into the tank 14 for passage again through the filter 19. Thus, during periods of nonoperation of the washing apparatus, the pump 9a functions to circulate the water from the tank 14 to the tank 18 and, at the same time, filter out undesired particles therefrom. Lightweight contaminants will be skimmed off the surface of the water in the tank 14 at the outlet 16. When it is desired to utilize the reclaimed and filtered water in the operation of the washing apparatus 5, a suitable automatic switch system can function to reverse the normal positions of the valves 24, 25, and 29, so as to close the valves 24 and 29 and open the valve 25. Consequently, at this same time, the pump 9 may be energized to draw the water from the tank 8 and utilize it. Thus, filtered water will be drawn from the bottom of the tank 18 at the low point 23 by way of the pipe 22 and conducted once again through the filter 19 and through the pipe 28 into the tank 8 and from which it is drawn for use as indicated.

It will be apparent that the present invention provides a mechanically simple, but effective apparatus for reclaiming normally wasted detergent solution or other valuable liquids by removing therefrom relatively lightweight liquid and solid contaminants by decantation, and by removing relatively heavier weight contaminants by sedimentation and filtration.

Having thus described this invention, what is claimed is:

1. Apparatus for reclaiming normally wasted liquids comprising:
   a. a settling receptacle arranged to receive a contaminated liquid and to cause sedimentation of solids therefrom, said receptacle having a decanting outlet in the upper region thereof;
   b. a reservoir having upper and lower regions and having a decanting outlet in the upper region thereof through which floating contaminants may be discharged from the upper level of liquid received in said reservoir, said reservoir being divided into a plurality of adjacent compartments communicating with one another at a level in said reservoir above the decanting outlet thereof, one of said compartments containing the decanting outlet of said reservoir and being arranged to receive liquid decanted from said receptacle and from another of said compartments;
   c. a filter; and d. liquid-circulating means communicating with said filter and including an inlet communicating with the lower region of said one compartment, a discharge outlet, and a recirculation outlet communicating with another of said compartments, said liquid-circulating mean being operable selectively to draw liquid from the lower region of said one compartment, pass it through said filter and thence either to said discharge outlet, or to another of said compartments.

2. Apparatus according to claim 1, wherein said liquid-circulating means comprises a double-branched conduit having inlets communicating with the lower regions of a first and a second compartment of said reservoir, a pump connected between said double-branched conduit and said filter, and valve means operable selectively to close either of the branches of said double-branched conduit, while opening the other branch, and to open or close the recirculation outlet of said liquid-circulating means.